RINGING CONTROL CIRCUIT FOR TELEPHONE SYSTEMS

Filed May 27, 1954 5 Sheets-Sheet 1

INVENTOR
GEORGE ELLIOTT
BY Francis I. Blake
ATTORNEY

Feb. 19, 1957 G. ELLIOTT 2,782,260

RINGING CONTROL CIRCUIT FOR TELEPHONE SYSTEMS

Filed May 27, 1954 5 Sheets-Sheet 2

INVENTOR
GEORGE ELLIOTT
BY
Francis I. Blake
ATTORNEY

Feb. 19, 1957 G. ELLIOTT 2,782,260

RINGING CONTROL CIRCUIT FOR TELEPHONE SYSTEMS

Filed May 27, 1954 5 Sheets-Sheet 3

INVENTOR
GEORGE ELLIOTT
BY
Francis E Blake
ATTORNEY

Feb. 19, 1957 G. ELLIOTT 2,782,260

RINGING CONTROL CIRCUIT FOR TELEPHONE SYSTEMS

Filed May 27, 1954 5 Sheets-Sheet 4

INVENTOR
GEORGE ELLIOTT
BY
Francis E. Blake
ATTORNEY

RINGING CONTROL CIRCUIT FOR TELEPHONE SYSTEMS

Filed May 27, 1954

5 Sheets-Sheet 5

INVENTOR
GEORGE ELLIOTT
BY
Francis E Blake
ATTORNEY

United States Patent Office 2,782,260
Patented Feb. 19, 1957

2,782,260

RINGING CONTROL CIRCUIT FOR TELEPHONE SYSTEMS

George Elliott, Rochester, N. Y., assignor, by mesne assignments, to General Dynamics Corporation, a corporation of Delaware Application May 27, 1954, Serial No. 432,755

5 Claims. (Cl. 179—17)

This invention relates to dial telephone systems, and more particularly to the control of the application of ringing current to a party line in a dial telephone system.

Dial telephone systems providing party line operation are well known. In some of such systems, calls to a particular party on a party line are identified by a characteristic ringing signal such as a coded signal in which the identifying code may be the number of rings in quick succession in a ringing cycle. In other systems, characteristic different frequency selective ringers are connected to the party line at each party station and a different frequency of ringing current is applied to the line in order to ring the desired called party. In order to determine and select the characteristic ringing signal, the connectors of some systems are provided with a directively stepped switch responsive to impulses of the last dialed party identifying digit. The disadvantage of such an arrangement is that a party on the line may not retain the same number in the event that he moves to a new location and is of necessity connected to a different party line. To enable a party to have the same number regardless of what party line is used, a so-called terminal per station party line connector has been used. In the terminal per station arrangement, the first and second stepped positions of the connector and the line terminals selected thereby determine the character of the ringing so that a party may be connected within the exchange by jumpers from the connector terminals to any party line, provided that the characteristic ringing for such party is different than the characteristic ringing for other parties on the party line.

Various arrangements for characterizing the ringing to different parties on a party line connected to a terminal per station connector have been devised. Considerations of importance are that the number of different ringing current frequencies to be used should be not excessive and preferably not more than five; that the frequency selective ringers should be bridged across the line for better line balance; and that code ringing, if used, should not make the ringing cycle excessively long and yet should provide a reasonable length of ringing interval.

It is therefore a principal object of the present invention to provide a dial telephone system having an improved terminal per station party line connector and ringing control circuit to enable the use of a plurality of frequency selective ringers to be bridged across the line, with at least two of the ringers responding to the same frequency of ringing current in order to reduce the number of required frequencies of ringing current, and with a one and two ring code being used to distinguish calls to the parties having the same frequency of ringing current.

In circuits of this type, the application of ringing current more than once to the conductors of a called line during the time period of the complete ringing cycle may result in a ringing cycle of excessive time length, or in a reduction of the length of time the ringing current is connected at each application. Neither the excessively long interval between the ringing current applications nor the shortening of each application of ringing current is desirable from a telephone user's standpoint.

It is a further object of my invention to decrease the said timing interval for the complete ringing cycle and also to increase the time of each ringing current application.

In practicing the invention, for party lines having bridged frequency selective ringers for each party on a party line, a plurality of ringing current conductors are connected in common to a plurality of terminal per station connectors. A ringing generator circuit is arranged to connect a plurality of sources of different frequencies of ringing current to said conductors individually in spaced time sequence during a single ringing cycle and the timing with respect to said different conductors is such that various ringing codes may be produced by the selective application of said conductors in pairs.

A ringing application control circuit including one of the selectively connected terminals of the terminal per station connector is arranged to connect selected pairs of said conductors to the directively selected and connected party line in timed relation to the connection of a predetermined frequency of ringing current to said conductors thus determining the frequency of ringing current and the coded number and character of ringing current applications to the party line for a ringing cycle in accordance with the particular group of terminals selected by the directive operation of the terminal per station connector.

An object of the present invention is to provide means for producing different ringing codes each of which provides substantially the same total time of application of ringing current within a standard length of ringing cycle regardless of the division of said application into different numbers of periods. In a preferred embodiment of this invention, means for producing a one ring code and a two ring code, wherein the one ring is of substantially twice the length of each of the periods of the two rings, is provided. In accordance with this embodiment, three common ringing conductors leading to the connectors are used and in accordance with a selection made of a particular set of connector terminals a particular pair of these conductors will be applied to the called line. In one case, ringing current from a first conductor and a second conductor will be sequentially applied to the called line for substantially equal but overlapping periods, while in a second case, ringing current from a first conductor and a third conductor will be sequentially applied to the called line for substantially equal but spaced apart periods. There is thus provision for a one long ring and a two short ring code in which the total time of application of the ringing current in each such code is substantially equal.

Another feature of the invention is a recycling means consisting of a counting means within the connector circuit whereby the counting of two applications of ringing current in each code, whether overlapping to provide a one ring code or separated to provide a two ring code, will restore the connector circuit to its original condition and thus put it in condition to respond to another code in a following ringing cycle.

The present invention is an improvement on the arrangement disclosed in my Patent Number 2,659,770, issued November 17, 1953, and that disclosed in the application of Elliott and Pharis, Serial Number 329,242, filed January 2, 1953, now Patent Number 2,702,831.

The drawings consist of five sheets having seven figures, as follows.

Figures 1, 2:
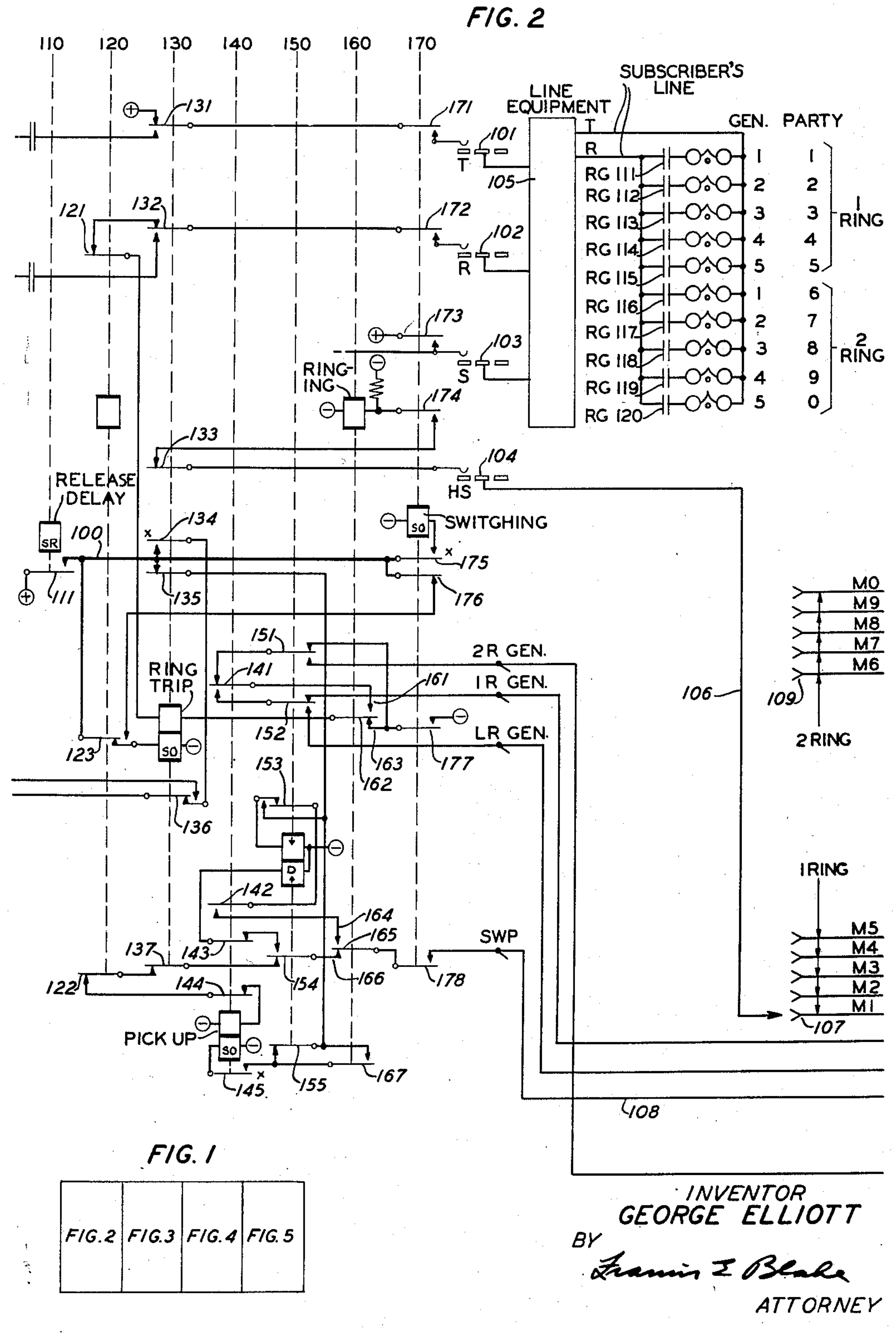
Fig. 1 is a block diagram showing how Figs. 2 to 6, inclusive, should be placed to provide a complete schematic diagram of the circuit of the present invention.
Fig. 2 is a partial schematic circuit diagram of a terminal per station party line connector having directively selected groups of terminals each including a tip, ring, sleeve and hunt sleeve terminal, and showing the essential elements of a party line which may be directively selected by said connector.
Figure 3:
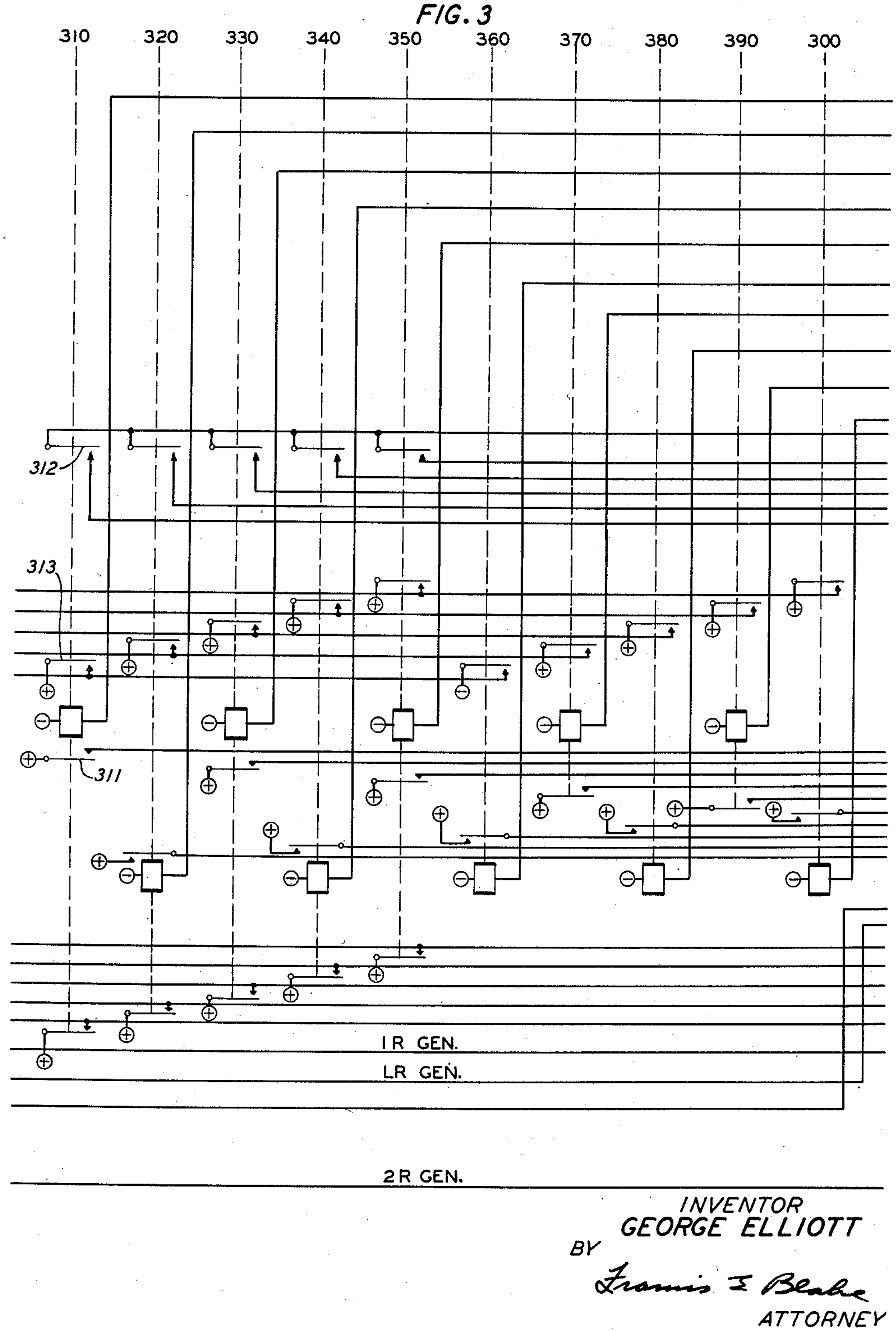
Figure 4:
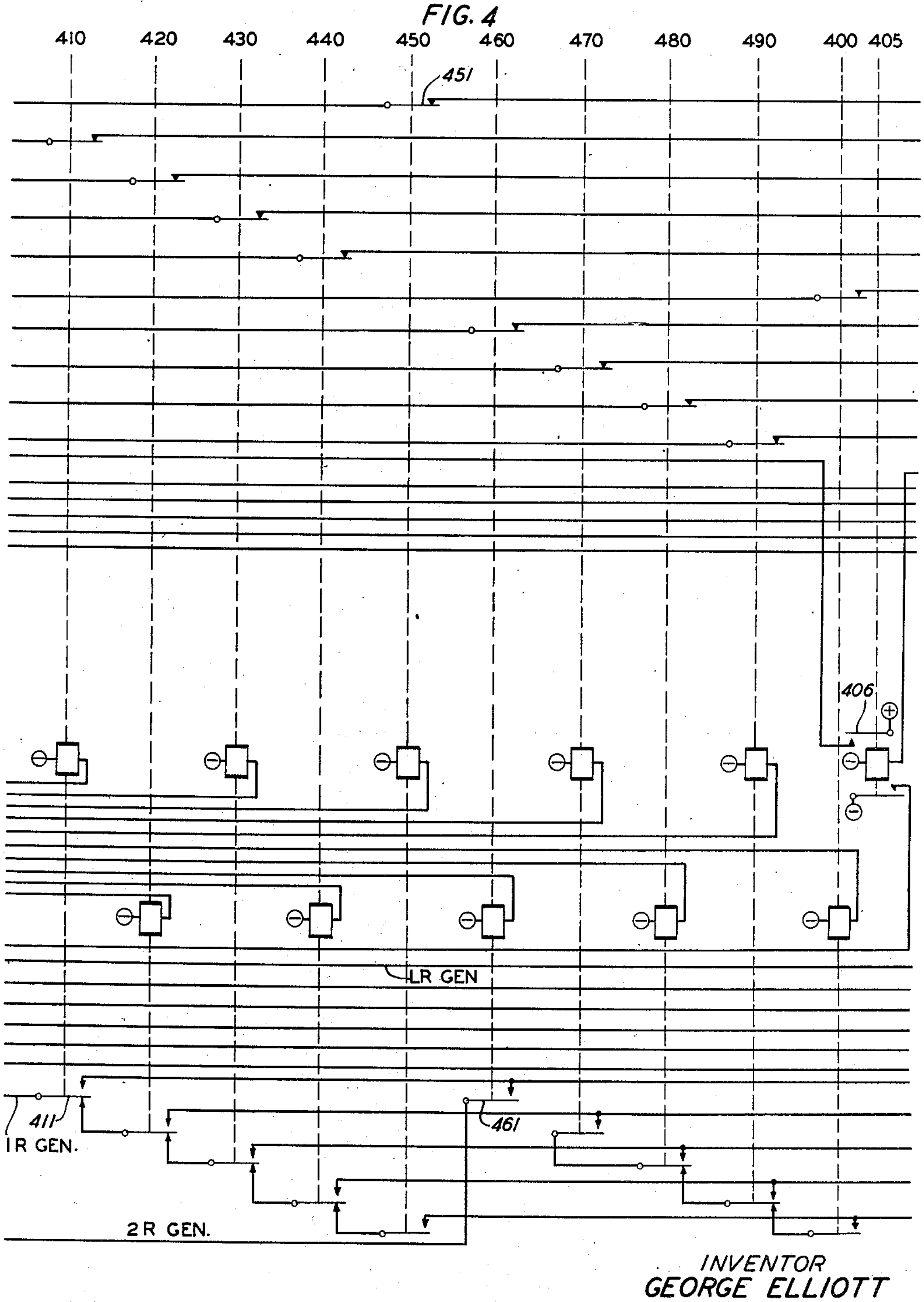
Figure 5:
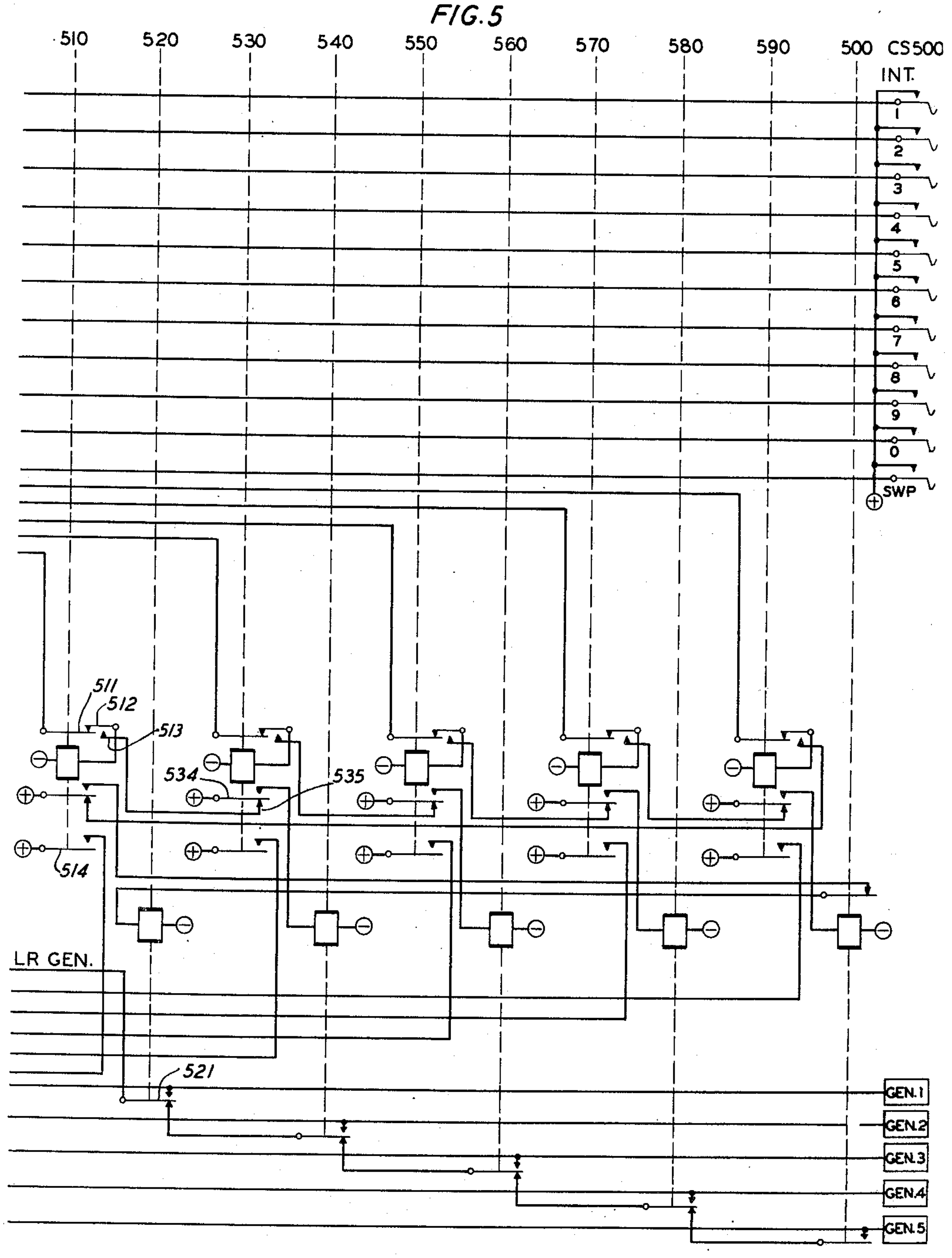
Figure 6:
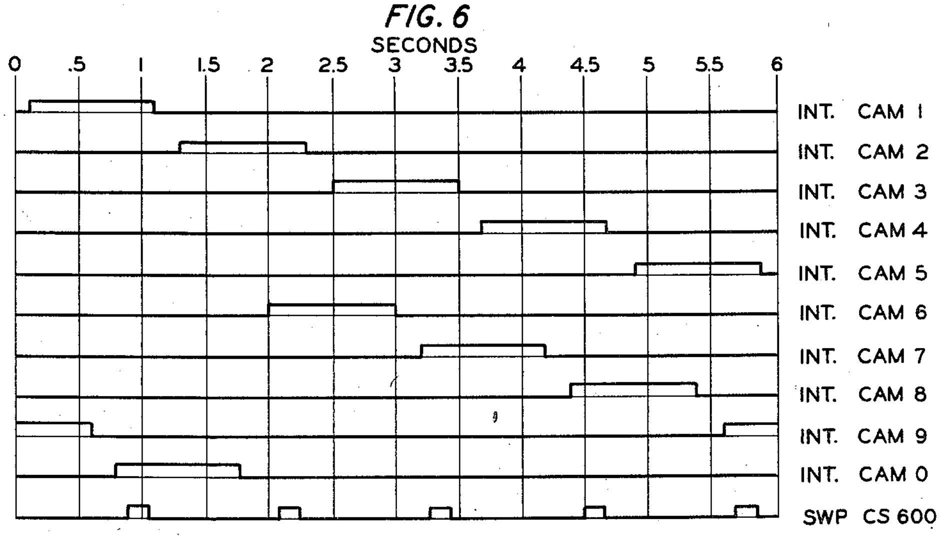
Figure 7:
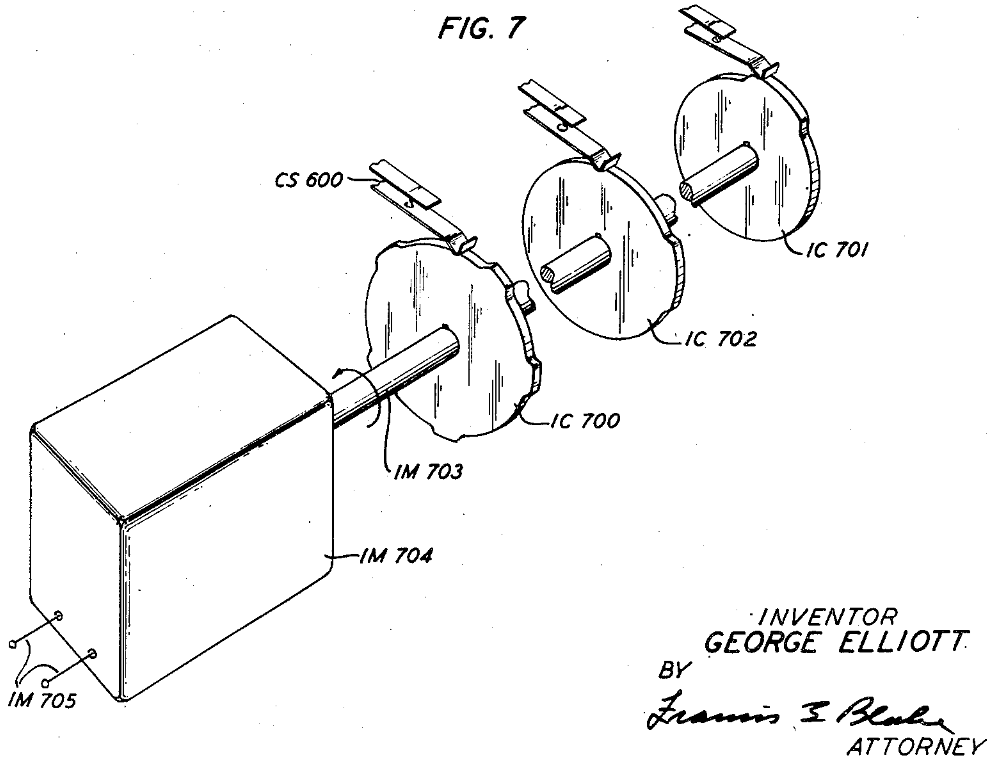

Figs. 3, 4 and 5 contain circuit details of common equipment constituting a plurality of different frequency generators and means for applying these sources in a timed pattern to a plurality of ringing conductors multipled to a plurality of connectors such as that shown in Fig. 2;

Fig. 3 shows the relays directly responsive to the timing cams and which function to operate the ringing relay of the connector at the proper time;

Fig. 4 shows the relays responsive to the relays of Fig. 3 and which function to apply generator current to certain of said ringing conductors;

Fig. 5 shows a third set of relays jointly responsive to certain of said relays of Fig. 3 and a common pick up cam and which function to apply generator current to other of said ringing conductors;

Fig. 6 is a timing chart of the various cams employed which, placed to the right of Fig. 5, line up with the cam contacts shown at the right of Fig. 5; and Fig. 7 is a perspective detail showing the mechanical arrangement of the interrupter cams.

The common ringing circuit consists of a set of five sources of different frequency ringing current indicated in small rectangles at the lower right corner of Fig. 5 and labeled GEN 1 to GEN 5, inclusive. By means of a camming arrangement shown in Fig. 7, and the three groups of relays shown in Figs. 3, 4 and 5, these sources are applied in a timed pattern to three ringing conductors here designated 1R–GEN, 2R–GEN and LR–GEN.

As it will appear hereinafter, a code of one long ring will be produced by first applying the 1R–GEN lead to the called line and then applying the LR–GEN to the called line, the timing of these applications overlapping so that the bells of two stations on the party line responding to the particular frequency current will both ring for a single continuous period of two-seconds. When a two ring code is to be produced, then the 1R–GEN lead is first applied to the called line and then the 2R–GEN leads is applied thereto, but these applications do not overlap and hence a two ring code of two one-second applications of ringing current, separated by a period of nearly one-second, is produced whereby the two stations or the party line which respond to the same frequency ringing current will be called.

The group of cam springs generally shown at CS–500 in Fig. 5 are operated at varying times, charted in Fig. 6 by the correspondingly numbered cams, three of which are shown in perspective in Fig. 7. Thus the SWP cam springs CS–600 for supplying the train of pick up pulses are operated by interrupter cam 1C–700. Cam 1, 1C–701 and cam 2, 1C–702, as well as the cam 1C–700, are mounted on an interrupter shaft 1M–703 which is continuously rotated in a counterclockwise direction at the rate of one complete revolution every six seconds (or at any other arbitrary rate as desired) by an interrupter motor 1M–704 energized from a suitable power source 1M–705. This interrupter machine and its components are entirely conventional and are well known in the art. On each interrupter cam is a raised portion which may be of an arbitrary length and which will close its cam spring contacts correspondingly during each revolution of the said cam. In Fig. 6, the profile of each cam has been shown superimposed on a timing chart corresponding to one cycle of cam revolution in six seconds. The periodic closure of the various cam spring contacts during the rotation of the interrupter cams energizes various relays correspondingly to connect the various ringing generator sources GEN 1 to GEN 5 to the ringing leads 1R–GEN, 2R–GEN and LR–GEN as will be explained in detail hereinafter.

The timing of these cams is depicted in Fig. 6. In addition, the timing may be stated as follows:

| | Seconds |
|---|---|
| Cam **1** | 0.1 to 1.1 |
| Cam **2** | 1.3 to 2.3 |
| Cam **3** | 2.5 to 3.5 |
| Cam **4** | 3.7 to 4.7 |
| Cam **5** | 4.9 to 5.9 |
| Cam **6** | 2.0 to 3.0 |
| Cam **7** | 3.2 to 4.2 |
| Cam **8** | 4.4 to 5.4 |
| Cam **9** | 5.6 to 0.6 |
| Cam **0** | 0.8 to 1.8 |
| SWP | 0.9 to 1.05 |
| SWP | 2.1 to 2.15 |
| SWP | 3.3 to 3.45 |
| SWP | 4.5 to 4.65 |
| SWP | 5.7 to 5.85 |

Now, by way of example, relay 310 responds to interrupter cam 1 and is therefore operated in time 0.1 second to 1.1 seconds, inclusive. Its circuit is closed through contacts 451 so that relay 310 cannot operate until relay 450, which was just previously operated, has fully released. With normal operation, relay 310 responds as stated. Relay 410 responds to the closure of contacts 311 so that this relay is operated over the same period of time as relay 310. Through the operation of relay 410 and by the closure of contacts 411, GEN 1 is connected to the 1R–GEN lead. Hence, current from GEN 1 is connected to 1R–GEN lead over the period 0.1 to 1.1 seconds, inclusive.

During this period, the SWP cam springs CS–600 close over the period 0.9 second to 1.05 seconds, and thereupon a circuit is extended through contacts 312 of relay 310, thence through contacts 511 and 512 of relay 510 to cause the operation of this relay. Relay 510 then locks in a circuit from ground, contacts 534 and 535 of relay 530, and contacts 513 and 512 of relay 510. Relay 510 therefore operates at time 0.9 second and remains operated until relay 530 operates. Since this does not happen until the next closure of cam springs CS–600, relay 510 will remain operated from 0.9 second until 2.1 seconds.

Relay 520 responds directly to relay 510 and is therefore operated from time 0.9 second until 2.1 seconds. During this time, relay 520 applies current from GEN 1 to the LR–GEN lead. It should be noted that the time 0.1 second to 1.1 seconds during which GEN 1 is applied to the 1R–GEN lead overlaps the time 0.9 second to 2.1 seconds during which GEN 1 is applied to the LR–GEN lead. Therefore if in the connector a connection made to the 1R–GEN lead is switched to the LR–GEN lead sometime during the overlapping period 0.9 second to 1.1 seconds, GEN 1 will be applied to a given circuit from 0.1 second to 2.1 seconds, a full two seconds.

It now may be noted that relay 360 directly responds to cam 6 and is therefore operated over the period 2.0 seconds to 3.0 seconds. Relay 460 responds directly to relay 360 and therefore it functions to apply GEN 1 through its contact 461 to the 2R–GEN lead over this period 2.0 seconds to 3.0 seconds.

Therefore, if in the connector circuit the 1R–GEN lead is first, over the period 0.1 second to 1.1 seconds, applied to a given circuit and then during the period 1.1 seconds to 2.0 seconds the circuit is switched to the 2R–GEN lead, a second application of GEN 1 current will be made to the given circuit over the period 2.0 seconds to 3.0 seconds whereby the two ring code will be transmitted.

In accordance with this arrangement, and by a similar arrangement of like relays, the timing may be stated as follows:

| | 1R-GEN | LR-GEN | 2R-GEN |
|---|---|---|---|
| GEN 1 | 0.1-1.1 | 0.9-2.1 | 2.0-3.0 |
| GEN 2 | 1.3-2.3 | 2.1-3.3 | 3.2-4.2 |
| GEN 3 | 2.5-3.5 | 3.3-4.5 | 4.4-5.4 |
| GEN 4 | 3.7-4.7 | 4.5-5.7 | 5.6-0.6 |
| GEN 5 | 4.9-5.9 | 5.7-0.9 | 0.8-1.8 |

The one ring code is the combination of the values in the first and second columns and the two ring code is the combination of values in the first and third columns.

With a complete understanding of the above timing, the operation of the device in connection with the establishment of a connection to a called line will now be clear.

Fig. 2 shows the essential portions of a terminal per station connector circuit embodying the invention. The remainder of the connector circuit (not shown) is entirely conventional and any similar connector switch circuit known in the art may be utilized. The frequency selective ringers shown in the upper right hand corner of Fig. 2 are also of any conventional type and are bridged across the party line. RG 111 and RG 116 are of a type to respond to GEN 1, RG 112 and RG 117 will respond to GEN 2, and so on. The party having ringer RG 111 will recognize a one ring code and will respond thereto whereas the party having RG 116 will recognize a two ring code. Thus will five different generators and by using one and two ring codes, ten parties on the line may be served.

On a call to a given party on this line, the release delay relay 110 will be operated conventionally and will ground the master ground wire 100 by its contacts 111. The switch will be driven to directively select the particular set of line terminals 101, 102, 103 and 104. If the line is found to be idle, then the switch through relay 170 will be operated conventionally so that ringing current may be applied to the line. Through its contacts 171 and 172 the tip and ring of the line are closed, by its contacts 173 the sleeve is grounded to mark the called line as busy, and through its contacts 175 this relay 170 is locked until the release delay relay 110 is finally released. Through contacts 177, a circuit is established from battery through contacts 163 and 162 of relay 160, the upper winding of the ring trip relay 130, contacts 121 of relay 120, contacts 132 of relay 130, contacts 172 of relay 170, ring brush and terminal 102, the line equipment 105 out over the ring of the line, back over the tip of the line, through the line equipment 105, the terminal 101 and the tip brush, contacts 171 of relay 170, contacts 131 of relay 130, to ground. While this circuit is effectively maintained, the ring trip relay will respond when and if any party on the line lifts his telephone from its cradle.

Let us assume that the HS terminal 104 of this particular set of line terminals is connected by jumper wire 106 to the marking terminal 107 whereby the one ring code by GEN 1 will be applied to the called line. The time at which relay 170 operates may fall at random at any point in the six second ringing cycle. Let us assume that relay 170 operates at time 3.68. There is no immediate response. At time 4.5, however, a pulse is transmited from CS 600 over conductor 108, through contacts 178 of relay 170, contacts 165 and 166 of relay 160, normally closed contacts 154 of relay 150, contacts 137 of relay 130, contacts 122 of relay 120, contacts 144 and upper winding of pick up relay 140, to battery. Relay 140 responds and locks through its lower winding, its contacts 145 (made before its contacts 144 open), contacts 155 of relay 150, contacts 135 of relay 130, to the master ground wire 100. At time 5.7, conductor 108 is grounded again, but since the pick up relay 140 is already operated, no other action takes place. At time 0.1, cam 1 causes the operation of relay 310 and through its contacts 313 this relay grounds, the marking terminal 107 so that a circuit is completed over jumper wire 106, terminal 104 and the HS brush of the connector, contacts 133 of relay 130, contacts 174 of relay 170, through the winding of relay 160, to battery. Relay 160 operates and transmits current from GEN 1 presently applied to 1R-GEN conductor through contacts 152 of relay 150, the now closed contacts 141 of relay 140, contacts 161 and 162 of relay 160, and thence over the circuit including the party line ringers previously traced.

At time 0.9 another pulse is transmitted by CS 600, whereupon relay 405 is operated and a circuit is closed from ground, contacts 406 of relay 405, contacts 312 of relay 310 over the circuit heretofore traced to operate relay 510 and in turn relay 520. The pulse on pick up conductor 108 is extended through contacts 178 of relay 170, contacts 165 and 164 of relay 160, contacts 142 of relay 140, contacts 153 of relay 150 and thence through the upper winding of relay 150, to battery. Relay 150 locks through its now operated contacts 153, and contacts 135 to ground on the master ground wire 100. At the same time, by the operation of relay 520, GEN 1 is connected to the LR-GEN lead whereby current from GEN 1 is transmitted through the now operated contacts 152 of relay 150 over the circuit including the called line hereinbefore traced. Through the operation of relay 510 and by its contacts 514, the marking contact 107 is maintained grounded so that the bells RG 111 and RG 116 will continue to operate until time 2.1 when relay 510 is released through the operation of relay 530.

At time 2.1, and due to the operation of relay 530, the ground is removed from marking conductor 107 so that the ringing relay 160 is released. Thereupon the holding circuit of the pick up relay 140 is opened and this relay releases before the release of the relay 150 can close the alternate holding circuit therefor. Hence the pulse from cam switch CS 600 at time 2.1 functions to operate relay 530, to release relay 160, to release the pick up relay 140 and thereafter to release relay 150.

Thus, shortly after time 2.1 when relay 405 again operates, ground extended now over conductor 108 is further extended over contacts 178 of relay 170, contacts 165 and 166 of relay 160, just released, operated contacts 154 of relay 150, contacts 143 of relay 140 and thence through the lower winding of the differentially wound relay 150 whereby this relay becomes deenergized thus returning the circuit to normal. This ringing cycle may then be repeated indefinitely until the called party answers or until the calling party releases.

If the called party answers during a silent period, then the ring trip relay responds by direct current flow from the battery extended over contacts 177. If the called party answers during the ringing period, then the ring trip relay will respond by increased ringing current flow. In either case, relay 130 operates and locks through its lower winding and the contacts 123 of relay 120 to the master ground.

It is believed to be apparent that if the jumper wire 106 is connected to the M6 marking terminal 109, the ringers RG 111 and RG 116 will be operated by the two ring code hereinbefore described.

Now let us assume that the SW relay 170 happens to be first operated at time 0.65, that is while the relay 160 is operated. Since the relay 140 has not as yet been operated, ringing current will not be transmitted to the called line but the tripping circuit will be completed from battery, contacts 177, the closed contacts 151 of relay 150, not operated, the closed contacts 141 of relay 140, not operated, contacts 161 and 162 of relay 160, and thence over the circuit hereinbefore traced so that should a subscribed on the party line lift his telephone, the ring trip relay 130 may be operated. During this period of time 0.9, the pick up conductor 108 will be grounded but this ground will cause no operation since the circuit is opened by the contacts 142. Hence no circuit operation can take place until relay 160 releases and the pick up relay is thereafter operated as hereinbefore described.

In the case of the two ring code, should the relay 170 happen to be operated at a time which is between the two rings of the code, say at time 1.50, then the relay 160 will be operated at time 2.0 so as to establish the condition just above described. Therefore, when the next pick up pulse is transmitted at time 2.1, it can cause no circuit operation and the ringing code cannot be mutilated.

In the case of the two ring code, a pick up pulse occurs at time 0.9 whereupon the relay 150 is operated as before so that the ringing is switched from the 1R–GEN lead to the LR–GEN lead for the remainder of the time during which the ringing relay 160 is operated, that is, until time 1.1 seconds. At this time, as relay 160 releases, the pick up relay is released. At time 2.0, when the ringing relay 160 is again operated, the second ring of the code will be transmitted. The pick up pulse at time 2.1 is ineffective to operate the pick up relay as before. However, on the following pick up pulse at time 3.3 seconds, since the ringing relay 160 is not operated, the relay 150 will be released by the energization of its lower differentially wound winding as before described.

It will thus be clear that the pick up relay 140 and the differentially wound relay 156 constitute a counting combination which effectively counts the application of two one-second periods of ringing current to the called line, whether these overlap or not. This counting means operates to recycle the circuit and prepare it for similar operation during the next ringing cycle.

Operation of the circuit by other ringing current generators for other frequency combinations is believed to be clear without further description.

What is claimed is:

1. In a telecommunication system, a ringing current application system comprising a plurality of common ringing current conductors, means for sequentially applying ringing currents of different character thereto, the periods of application of each current of like character to said different conductors being staggered, means for selectively and sequentially employing said common conductors in pairs for producing time coded ringing current applications, one such selected pair providing overlapping periods for a single long ring code and another such selected pair providing time spaced periods for a two short ring code.

2. In a telecommunication system, a ringing current application system comprising a plurality of common ringing conductors, means for sequentially applying ringing currents of different character thereto during a ringing cycle, the periods of application of each current of like character to said different conductors being of substantially equal length but at different portions of a ringing cycle, the said periods on a second of said conductors overlapping those on a first conductor and the said periods on a third of said conductors being spaced apart from those on a first conductor, and means for selectively and sequentially employing said common conductors in different combinations for producing time coded ringing current applications.

3. In a telecommunication system, a ringing current application system comprising a plurality of sources of different character ringing current, timing means, a plurality of groups of relays, the relays of certain of said groups responding directly to said timing means and the remaining relays responding to said relays of said certain of said groups, a plurality of common ringing current conductors, means controlled by said relays for periodically and sequentially applying said sources of ringing current to said conductors, the periods of application of a given character current to a second of said conductors overlapping the periods of application of like current to a first of said conductors and the periods of application of a given character current to a third of said conductors being spaced apart from the periods of application of like current to a first of said conductors, a plurality of conductors equal in number to the number of said sources of current multiplied by the number of codes of current application to be produced, means comprising an individual connection to a given one of said last plurality of conductors for sequentially connecting a selected plurality of said first conductors to a given circuit during periods of application of like character current thereto.

4. In a dial telephone system, a connector having a plurality of different groups of connector terminals to be directively selected in response to dial impulses, each of said groups of terminals including a pair of talking conductor terminals, means to connect the talking conductor terminals of a plurality of different groups of connector terminals in parallel to a party line, a plurality of different frequency sources of ringing current, a plurality of common ringing conductors for transmitting ringing current from said sources to said connector, a rotatable cam shaft, means to rotate said shaft, two groups of cam operated switch means including cams mounted on said rotatable cam shaft, the number of cams and cam operated switch means in each said group being equal in number to the number of said different frequency sources, said cam switches in each said group being arranged to operate periodically and sequentially, a single common cam on said cam shaft and a cam switch responsive thereto arranged to close a plurality of times equal in number to the number of said sources of current, a relay responsive to each said cam switch means responsive to said relays of each of said two groups for applying said sources of current to said common ringing conductors periodically and sequentially, the periods of application of any given source of current to different ones of said common conductors differing in time relation, being overlapping with respect to a given pair of said common conductors and spaced apart with respect to another given pair, a plurality of marking conductors equal in number to the number of said sources of current multiplied by the number of said groups of cam operated switch means, means for interconnecting a single terminal of each said group of connector terminals with a different one of said marking conductors, a pick up relay responsive to said cam operated switch arranged to close a plurality of times in each ringing cycle, a ringing relay responsive to the particular marking terminal to which a particular group of connector terminals is connected and a switching relay for connecting said common ringing conductors sequentially to said talking conductors whereby a selected ringing code consisting of two ringing applications overlapped to form one long ring or spaced apart to form two short rings is transmitted over said talking conductors, said switching relay and said pick up relay operating in a two step cycle within each ringing cycle.

5. In a dial telephone system, a connector having a plurality of different groups of connector terminals to be directively selected in response to dial impulses, each of said groups of terminals including a pair of talking conductor terminals and another control terminal, a plurality of said groups having their talking conductor terminals connected in parallel to a party line and their control terminals connected individually each to a different marking terminal, common apparatus including a plurality of marking terminals associated with said connector and other like connectors, said common apparatus comprising a ringing control circuit having a plurality of sources of different character ringing current, a constantly operating interrupter device for periodically producing a series of circuit alterations constituting a series of ringing cycles, a plurality of common ringing conductors extending into said connector circuit and a plurality of marking conductors extending to said marking terminals, means for sequentially applying ringing current from said sources of ringing current over equal periods during a ringing cycle to said common ringing conductors, the periods of application of each source of like character current to said different conductors being at different times within a ringing cycle, the said periods for a second of said conductors overlapping those for a first conductor and the said periods for a third conductor being spaced apart from those for said first conductor, whereby the sequential connection of said first and second of said conductors will produce a one long ring code and the sequential connection of said first and third of said common conductors will produce a two short ring code, the timing of said codes being such that all codes embrace equal total periods of ringing current application within each said ringing cycle, said means for sequentially applying ringing current to said common conductors also constituting means for applying correspondingly timed signaling pulses to said marking conductors, and means in said connector circuit responsive to said individual marking connection for selectively connecting said common ringing conductors to said party line talking conductors.

No references cited.